US006816159B2

(12) United States Patent
Solazzi

(10) Patent No.: US 6,816,159 B2
(45) Date of Patent: Nov. 9, 2004

(54) INCORPORATING A PERSONALIZED WIREFRAME IMAGE IN A COMPUTER SOFTWARE APPLICATION

(76) Inventor: Christine M. Solazzi, 3021 30th Ct., Jupiter, FL (US) 33477

( * ) Notice: Subject to any disclaimer, the term of this patent is extended or adjusted under 35 U.S.C. 154(b) by 313 days.

(21) Appl. No.: 10/013,383

(22) Filed: Dec. 10, 2001

(65) Prior Publication Data

US 2003/0107570 A1 Jun. 12, 2003

(51) Int. Cl.⁷ .................................. G06T 15/00
(52) U.S. Cl. ................ 345/419; 345/706; 345/757
(58) Field of Search .................. 345/420, 619, 345/629, 630, 632, 633, 382, 419, 423, 427, 428, 581, 582, 606, 623, 624, 625, 634, 646, 647, 473, 706, 757; 463/30, 32, 33

(56) References Cited

U.S. PATENT DOCUMENTS

| | | | |
|---|---|---|---|
| 4,521,014 A | 6/1985 | Sitrick | 271/1 |
| 4,710,873 A | 12/1987 | Breslow et al. | 364/410 |
| 5,111,409 A | 5/1992 | Gasper et al. | 395/152 |
| 5,149,104 A | 9/1992 | Edelstein | 273/434 |
| 5,347,306 A | 9/1994 | Nitta | 348/15 |
| 5,375,195 A | 12/1994 | Johnston | 395/135 |
| 5,595,389 A | 1/1997 | Parulski et al. | 463/31 |
| 5,611,037 A | 3/1997 | Hayashi | 395/142 |
| 5,736,982 A * | 4/1998 | Suzuki et al. | 345/706 |
| 5,742,291 A * | 4/1998 | Palm | 345/420 |
| 5,830,065 A * | 11/1998 | Sitrick | 463/31 |
| 5,969,721 A | 10/1999 | Chen et al. | 345/419 |
| 5,995,119 A | 11/1999 | Cosatto et al. | 345/473 |
| 6,016,148 A | 1/2000 | Kang et al. | 345/425 |
| 6,020,892 A | 2/2000 | Dillon | 345/419 |
| 6,031,539 A | 2/2000 | Kang et al. | 345/419 |
| 6,034,692 A | 3/2000 | Gallery et al. | 345/427 |
| 6,056,640 A | 5/2000 | Schaaij | 463/4 |
| 6,072,496 A | 6/2000 | Guenter et al. | 345/419 |
| 6,088,040 A | 7/2000 | Oda et al. | 345/435 |
| 6,227,974 B1 * | 5/2001 | Eilat et al. | 463/40 |
| 6,268,872 B1 * | 7/2001 | Matsuda et al. | 345/473 |
| 2002/0113809 A1 * | 8/2002 | Akazawa et al. | 345/706 |
| 2004/0075677 A1 * | 4/2004 | Loyall et al. | 345/706 |

* cited by examiner

Primary Examiner—Mark Zimmerman
Assistant Examiner—Enrique L Santiago
(74) Attorney, Agent, or Firm—Christopher & Weisberg, P.A.

(57) ABSTRACT

A method and system for incorporating a personalized wireframe image within a computer software application. The method can include comparing an acquired image of a computer software application user with one or more pre-stored wireframe images in an image database. One of the pre-stored wireframe images can be selected which has image attributes similar to attributes of the acquired image. The selected wireframe image can be modified, the modification creating the personalized wireframe image of the user. Finally, the personalized wireframe image can be incorporated as a character within the computer software application. For example, the computer software application can be a computer gaming application.

19 Claims, 3 Drawing Sheets

INCORPORATING A PERSONALIZED WIREFRAME IMAGE IN A COMPUTER SOFTWARE APPLICATION

BACKGROUND OF THE INVENTION

1. Technical Field

This invention relates to the field of image processing, and more particularly, to the incorporation of wireframe images in a computer software application.

2. Description of the Related Art

Images can be represented in many forms. Traditionally, images have been represented as photographs or pictures, photographic negatives, photographic slides, view-graphs images, paintings, and drawings. While these traditional forms of images remain quite popular, computer technology has revolutionized both the creation, representation and display of traditional images. In fact, computing devices have revolutionized the creation, manipulation and presentation of images.

Computer images typically are represented as a collection of dots referred to in the art as "pixels". In conventional computer display systems, pixels can be arranged both in rows and columns specifying a display grid. Additionally, each of the pixels can be configured to display a specific color. While monochrome images include only two types of colored pixels, depending upon available computing power, pixels can be configured to display as many as 16.7 million colors.

The resolution of an image typically can be determined by the size and/or spacing of the pixels forming the image. Image resolution typically can be measured in pixels per inch (PPI) or dots per inch (DPI). When measuring image resolution, increasing values of PPI or DPI can translate to increasing and improving resolution of the image. Notably, high resolution images can provide greater subject detail and more realistic color transitions than can low resolution images.

The physical dimensions of an image often are referred to as image size. As will be apparent to one skilled in the art, the image size can be directly related to the image resolution. Since an image contains a fixed number pixels, increasing the image size will decrease the image resolution since the number of pixels remains the same but the image size has increased. Conversely, decreasing the image size will increase the image resolution since the number of pixels remains the same but the image size has decreased.

Three-dimensional (3D) modeling refers to the creation of a three-dimensional image. Generally, 3D modeling can include the conversion of a two-dimensional (2D) image into a 3D image that can have properties or characteristics such as depth, shadow and weight. A 3D image can also display reflective and refractive characteristics. For example, a 3D image of an object can cast shadows or reflect the surroundings in order to illustrate the ability of the object to reflect light.

In order to represent different types of images, various computer image formats have be created. These image formats can include bitmap images and vector graphic images. Bitmap or raster images are generally used for representing 2D images while vector graphic images are generally used for representing 3D images. A bitmap image is made up of individual pixels that appear to form a complete image. A vector graphics image utilizes geometric information or vectors that are used to define the appearance of the image. By using vectors to define the appearance of the image, the dimensions and physical appearance of the image or objects in the image, can be readily manipulated. For example, the surface of the object in image can be changed and mobility such as rotation, added to enhance the image.

A wireframe is the basic building block of a 3D object. The wireframe is the skeleton or underlying structure that binds the image or objects in an image together. A wireframe consists of a multiplicity of intersecting lines which are connected so that they create polygons which form the outline of the image. FIG. 1 depicts an exemplary wireframe 100 that can be used to create a 3D ball. The 3D ball of FIG. 1 includes a series of vertical lines in the shape of concave arcs, a series of vertical lines in the shape of convex arcs, a series of horizontal lines in the shape of concave arcs, and a series of horizontal lines in the shape of convex arcs. The concave and convex arcs are drawn in such a manner that they inter to form small polygons 110 that represent the surface of the ball.

The process of creating a wireframe to represent the basic skeleton that forms the shape of an image is called rendering. Rendering can also include the application of a surface along with its attendant characteristics and/or properties to the image. For example, properties such as color, depth, texture, reflective and motion properties can be added during the rendering process. The properties or characteristics of an image can be defined by attributes.

There are three well known rendering qualities that can be used to add properties to a wireframe. Good quality rendering uses the well-known Gouraud algorithm than can provide shading by determining the color and brightness of pixels located at each vertex 105 of the wireframe. The vertex is the point of intersection of the lines in a wireframe. Once the color and brightness of the pixels at each vertex is determined the color and brightness of the pixels located between the vertices can be interpolated.

By comparison, the Phong algorithm can provide the basis for improved rendering. In particular, the Phong algorithm can be used to provide shading by determining the color and brightness of all the pixels in the image. Better quality rendering provides a more realistic and smoother look than good quality rendering. However, better quality rendering requires more computing resources than better quality rendering.

Best quality rendering can be based upon an enhanced Phong algorithm that can add more realistic properties to an image. These properties can include bump maps, reflections, refractions, shadowing and depth. While the image quality is the superior to the other rendering methods, best quality rendering requires a significantly greater amount of computing power than good and better quality rendering.

Notably, enhanced image rendering can be used extensively in computer applications such as computer gaming. In particular, some computer gaming applications include digital "characters". Examples of such computer gaming applications include mystery and adventure games and arcade-style action games. In both cases, images of fictional characters, unfamiliar to the end-user, are incorporated as the primary component of the computer gaming application. In consequence, conventional computer gaming applications lack a level of personalization which could otherwise be provided through the use of character images more familiar to the end-user.

SUMMARY OF THE INVENTION

The present invention can include a method and system for incorporating a personalized wireframe image within a computer software application. The method can include comparing an acquired image of a computer software application user with one or more pre-stored wireframe images in an image database. One of the pre-stored wireframe images can be selected which has image attributes similar to attributes of the acquired image. The selected wireframe image can be modified, the modification creating the personalized wireframe image of the user. Finally, the personalized wireframe image can be incorporated as a character within the computer software application. In particular, the computer software application can be a computer gaming application.

Notably, the modifying step can further include adding image attributes to the transformed image. The image attributes can include an age, gender, race, weight, height, body type, skin tone, hair style, facial expressions, ears, moustache type, moustache color, beard type, beard color, eye type, and eye color. Also, the image attributes can include a clothing type, clothing color, foot size, footwear size, footwear color, hat type, and a hat size attribute.

The method also can include acquiring the acquired image using an optical imaging device. Examples of optical imaging devices can include digital still cameras, digital video cameras and optical scanners. The method further can include transforming the acquired image into a wireframe image prior to the comparison step. In that case, the comparison step can include comparing the transformed image with one or more pre-stored wireframe images in an image database.

Importantly, the method is not limited only to comparing the acquired image with pre-stored wireframe images. Rather, in an alternative aspect of the invention, the method can include comparing an acquired image of a computer software application user with one or more pre-stored images in an image database. One of the pre-stored images can be selected which has image attributes which are similar to attributes of the acquired image. The selected image can be transformed into a three-dimensional wireframe image. Subsequently, the transformed image can be modified, the modification creating the personalized wireframe image of the user. Finally, the personalized wireframe image can be incorporated as a character within the computer software application.

BRIEF DESCRIPTION OF THE DRAWINGS

There are shown in the drawings, embodiments which are presently preferred, it being understood, however, that the invention is not limited to the precise arrangements and instrumentalities shown, wherein.

DETAILED DESCRIPTION OF THE INVENTION

The present invention is a method and system for incorporating a personalized wireframe image within a computer software application such as a computer gaming program. In accordance with the inventive arrangements, a 2D image of the user can be acquired and compared with one or more wireframe images stored in a database. A wireframe image having features similar to those features of the 2D user image can be selected from the database. The selected wireframe image subsequently can be modified by adding attributes of the user thereby creating a more realistic 3D image of the user. Advantageously, the modified 3D user image can be incorporated within a computer software application, for instance as a fictional character within a computer gaming program.

Figure 1:
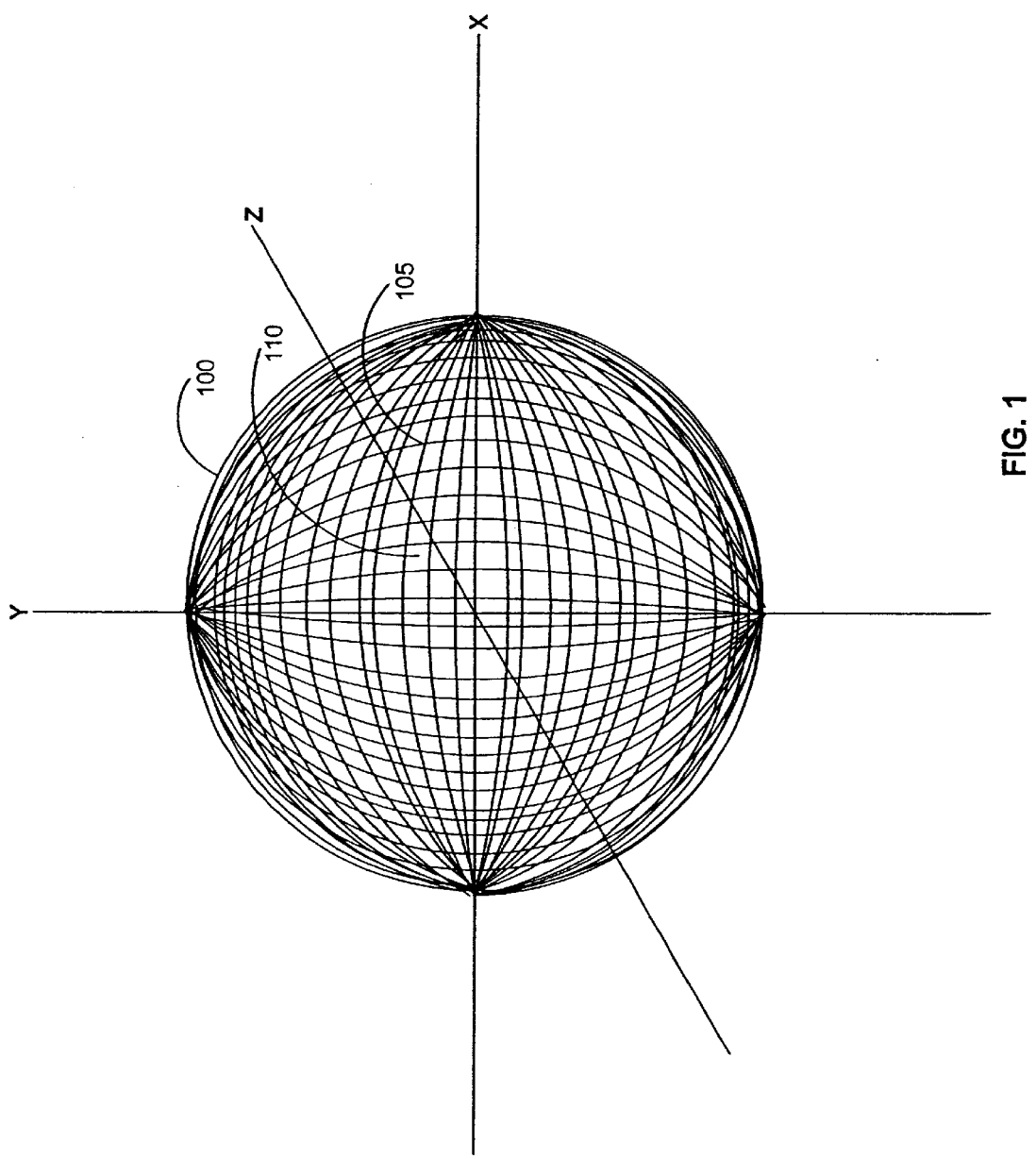
FIG. 1 depicts a wireframe, known in the art, which can be used to generate a 3D image of a ball.
Figure 2:
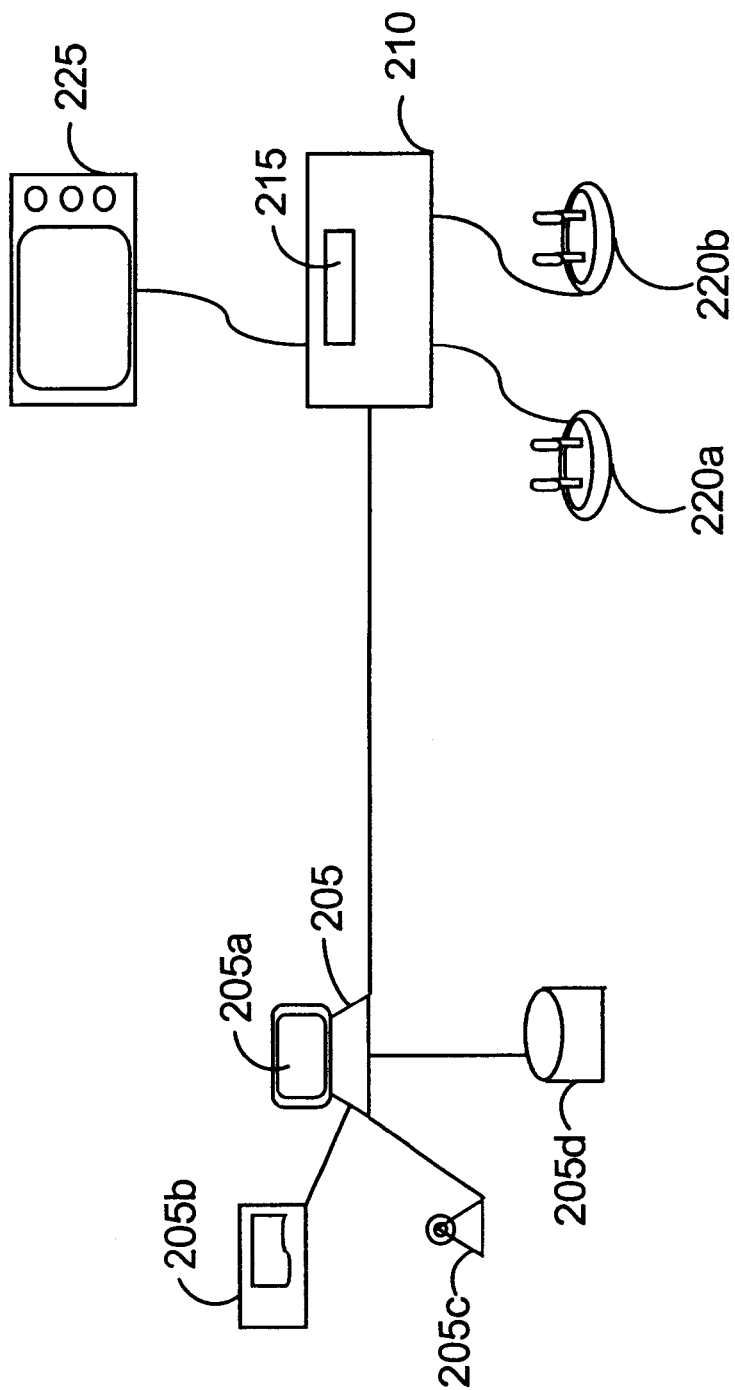
FIG. 2 is a block diagram illustrating a wireframe imaging system which has been configured in accordance with the present invention; and, FIG. 3 is a pictorial illustration of an exemplary graphical user interface (GUI) which can be used to facilitate the rendering of a personalized wireframe image.

FIG. 2 is a block diagram which illustrates an exemplary computing system which has been configured in accordance with the present invention. Referring to FIG. 2, there is shown a personal computer (PC) 205 connected to a gaming device. PC 205 can include both a computer display 205a and an image database 205d. A scanner 205b and camera 205c optionally can be connected as peripherals to the PC 205. The image database 205d can include both a storage medium, such as a fixed disk, which can be internal or external to the PC 205, and also a database access application configured to manage access to images within the storage medium. In that regard, the image database 205d can store therein pre-defined images, enhanced images, and digitized images acquired from an image acquisition device, for instance the camera 205c or scanner 205b.

The gaming device 210 can include a game player 215 and game controllers 220a and 220b. Also, an additional display device 225 can be connected to the game hardware 210. In particular, the game player 215 can facilitate execution of a gaming software application. Game players, in general, are well-known in the art, and can process gaming software applications stored in CDROM media, DVD media, or game cartridge media. Game players typically produce video output for display in an external display device, for example the Monitor/TV 225.

As one skilled in the art will understand, in conventional software gaming systems, users can configure the operation of a computer game prior beginning play of the computer game. Game configuration can include, but is not limited to, selecting a user or character that will participate in or will be incorporated in the game. Users can configure the computer game by responding to prompts presented through display device 225 using game controllers 220a and 220b. Game controllers 220a and 220b also can be used during play of the computer game to manipulate various objects and characters presented on the monitor/TV 225 by the gaming software application.

Notwithstanding, the invention is not limited to the use of the gaming device 210 to process computer gaming applications. Rather, in other aspects of the invention, computer gaming applications can be processed, controlled and presented within a personal computer in the absence of an external gaming device. In particular, the use of personal computer in computer gaming has become popular since no additional specialized hardware is required to process the computer gaming application.

In operation, the PC 205 can be used to acquire a 2D image of a user, subsequently to transform the acquired 2D image into a 3D wireframe image of the user, and finally to present the transformed 3D wireframe image to a computer gaming application. Each of the acquisition, transformation and presentation tasks can be undertaken by one or more computer software applications. For instance, the acquisition task can be performed using a combination of the digital camera 205c or scanner 205b, and image capture software.

The image capture software can save captured images of a user as a bitmap or raster file. Subsequently, image comparison software can be used to compare elements of the raster image with images stored in the image database 205d. The comparison of the raster image with the images in the image database 205d can include locating a stored image that has image attributes which are similar to the user image. Notably, image comparison techniques are well-known in the art and are often utilized in content based image retrieval systems in which digitized images are compared against one or more images stored in an image database.

It should be noted that when selecting a stored image having properties which are similar to the captured image, it is not necessary to have an exact match. Rather, the comparison process can choose the a closest matching wireframe image in the absence of an exact match. Once an image has been selected, a rendering software application function can permit modification of the selected image. In particular, in the circumstance where the selected image does not appear to be similar to the user image, the image can be modified by the rendering software application function. Finally, the enhanced image can be transformed into a 3D wireframe image using transformation techniques well-known in the art.

Importantly, the invention is not limited to comparing a 2D captured image with stored 2D images. Rather, in other preferred aspects of the invention, the 2D captured image can be transformed into a 3D wireframe image using image transformation techniques well-known in the art prior to the comparison step. Only when transformed, can attributes of the transformed image be compared to attributes of wireframe images stored in the image database 205d. Furthermore, in yet other preferred aspects of the invention, the 2D captured image can be compared to aspects of 3D wireframe images stored in the image database 205d. In this regard, a computationally expensive wireframe image transformation may not be required.

Figure 3:
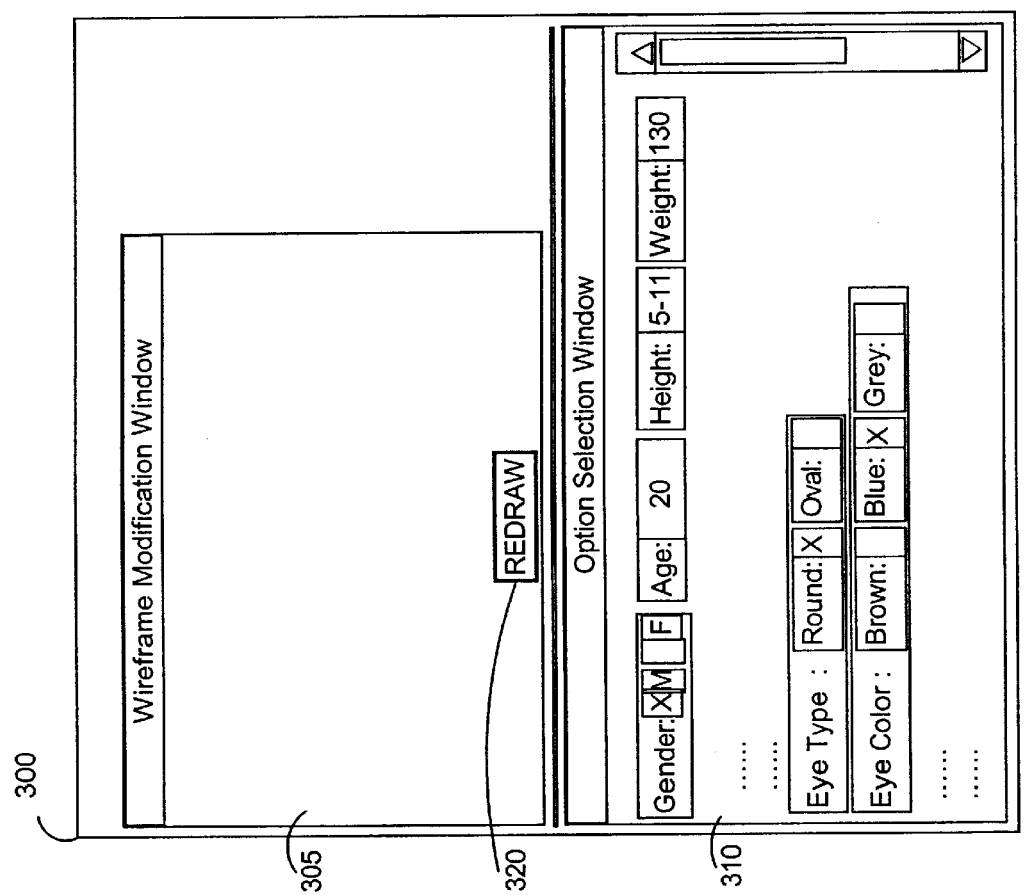

The rendering software application function can provide a list of attributes that can be utilized when rendering the enhanced image. The attributes can include but are not limited to age, gender, race, weight, body type, skin tone, hair style, ears, moustache type, moustache color, beard type, beard color, eye type, eye color, clothing type, clothing color, foot size, footwear size, footwear color, hat type, and hat size. FIG. 3 is a pictorial illustration of an exemplary GUI 300 that can facilitate the modification and rendering of a personalized wireframe image.

GUI 300 can include an option selection window 310 that can display and permit selection of attributes that can be utilized for modifying the personalized wireframe image. GUI 300 can also include a wireframe modification window 305 that can facilitate display and modification of the personalized wireframe image. Upon selection, which can include input, of an attribute in the option selection window 310, the wireframe image displayed in the wireframe modification window 305 can be immediately updated by selecting redraw button 320. For example, option selection window 310 depicts a female user age 20, weight 130 pounds, height 5' 11", having round blue eyes. By selecting brown eyes and changing the height to 5' 8", then selecting the redraw button 320, the user image displayed in the wireframe modification window 305 can be updated to reflect the changes. Hence, the wireframe image would be rendered with brown eyes and the stature of the user would reflect a person with a height of 5' 8".

Once the personalized wireframe image has been rendered, the image can be saved in the database 205d for subsequent use, or incorporated into the gaming software application. In one aspect of the invention, the personalized wireframe image can be downloaded directly to the game hardware where it can be stored in the local memory of the gaming device 210. In this case, several different personalized wireframe images can be stored in the local memory of the gaming device 210.

Advantageously, each of the stored personalized wireframe images subsequently can be retrieved from the local memory of the gaming device 210 while the computer game is being configured. Alternatively, personalized wireframe images can be included in a CD and manually transferred to the gaming device 210. In this case, the CD can be inserted in the player 215, and appropriate personalized wireframe images retrieved from the CD during the game configuration process.

Notwithstanding the foregoing detailed description of preferred aspects of the present invention, it should be recognized that modifications to these preferred aspects can be performed without departing from the spirit of the invention. For example, the present invention can be realized in hardware, software, or a combination of hardware and software. A method and system for incorporating a personalized wiréfram image within a computer software application according to the present invention can be realized in a centralized fashion in one computer system, or in a distributed fashion where different elements are spread across several interconnected computer systems.

Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for incorporating a personalized wireframe image within a computer software application, the method comprising:

comparing an acquired image of a computer software application user with a plurality of pre-stored wireframe images in an image database;

selecting one of said pre-stored wireframe images having image attributes which are similar to attributes of said acquired image;

modifying said selected wireframe image, said modification creating the personalized wireframe image of said user; and incorporating the personalized wireframe image as a character within the computer software application.

2. The method according to claim 1, wherein said modifying step further comprises adding image attributes to said transformed image, said image attributes comprising at least one of an age, gender, race, weight, height, body type, skin tone, hair style, ears, moustache type, moustache color, beard type, beard color, eye type, eye color, clothing type, clothing color, foot size, footwear size, footwear color, hat type, and hat size attribute.

3. The method according to claim 1, wherein said incorporating step comprises the adding the personalized wireframe image to a computer game as a character within said game.

4. The method according to claim 1, further comprising acquiring said acquired image using an optical imaging device.

5. The method according to claim 1, further comprising transforming said acquired image into a wireframe image prior to said comparison step.

6. The method according to claim 5, wherein said comparison step comprises comparing said transformed image with a plurality of pre-stored wireframe images in an image database.

7. A method for incorporating a personalized wireframe image within a computer software application, the method comprising:
- comparing an acquired image of a computer software application user with a plurality of pre-stored images in an image database;
- selecting one of said pre-stored images having image attributes which are similar to attributes of said acquired image;
- transforming said selected image into a three-dimensional wireframe image;
- modifying said transformed image, said modification creating the personalized wireframe image of said user; and
- incorporating the personalized wireframe image as a character within the computer software application.

8. The method according to claim 7, wherein said modifying step further comprises adding image attributes to said transformed image, said image attributes comprising at least one of an age, gender, race, weight, height, body type, skin tone, hair style, ears, moustache type, moustache color, beard type, beard color, eye type, eye color, clothing type, clothing color, foot size, footwear size, footwear color, hat type, and hat size attribute.

9. The method according to claim 7, wherein said incorporating step comprises the adding the personalized wireframe image to a computer game as a character within said game.

10. The method according to claim 7, further comprising acquiring said acquired image using an optical imaging device.

11. A personalized wireframe imaging system comprising:
- an image acquisition system;
- a database of pre-stored wireframe images;
- an image comparator configured to select pre-stored wireframe images having image attributes which are similar to image attributes associated with images acquired through said image acquisition system;
- an image enhancer through which end-users can modify said selected pre-stored wireframe images with additional image attributes; and,
- a computer gaming application interface through which said modified wireframe images can be incorporated into corresponding computer gaming applications.

12. A machine readable storage having stored thereon a computer program for incorporating a personalized wireframe image within a computer software application, the computer program comprising a routine set of instructions for causing the machine to perform the steps of:
- comparing an acquired image of a computer software application user with a plurality of pre-stored wireframe images in an image database;
- selecting one of said pre-stored wireframe images having image attributes which are similar to attributes of said acquired image;
- modifying said selected wireframe image, said modification creating the personalized wireframe image of said user; and
- incorporating the personalized wireframe image as a character within the computer software application.

13. The machine readable storage according to claim 12, wherein said modifying step further comprises adding image attributes to said transformed image, said image attributes comprising at least one of an age, gender, race, weight, height, body type, skin tone, hair style, ears, moustache type, moustache color, beard type, beard color, eye type, eye color, clothing type, clothing color, foot size, footwear size, footwear color, hat type, and hat size attribute.

14. The machine readable storage according to claim 12, wherein said incorporating step comprises the adding the personalized wireframe image to a computer game as a character within said game.

15. The machine readable storage according to claim 12, further comprising transforming said acquired image into a wireframe image prior to said comparison step.

16. The machine readable storage according to claim 15, wherein said comparison step comprises comparing said transformed image with a plurality of pre-stored wireframe images in an image database.

17. A machine readable storage having stored thereon a computer program for incorporating a personalized wireframe image within a computer software application, the computer program comprising a routine set of instructions for causing the machine to perform the steps of:
- comparing an acquired image of a computer software application user with a plurality of pre-stored images in an image database;
- selecting one of said pre-stored images having image attributes which are similar to attributes of said acquired image;
- transforming said selected image into a three-dimensional wireframe image;
- modifying said transformed image, said modification creating the personalized wireframe image of said user; and
- incorporating the personalized wireframe image as a character within the computer software application.

18. The machine readable storage according to claim 17, wherein said modifying step further comprises adding image attributes to said transformed image, said image attributes comprising at least one of an age, gender, race, weight, height, body type, skin tone, hair style, ears, moustache type, moustache color, beard type, beard color, eye type, eye color, clothing type, clothing color, foot size, footwear size, footwear color, hat type, and hat size attribute.

19. The machine readable storage according to claim 17, wherein said incorporating step comprises the adding the personalized wireframe image to a computer game as a character within said game.

* * * * *